June 5, 1934.  A. R. BARKER  1,962,049
LOCKING MECHANISM
Filed April 19, 1932   2 Sheets-Sheet 1
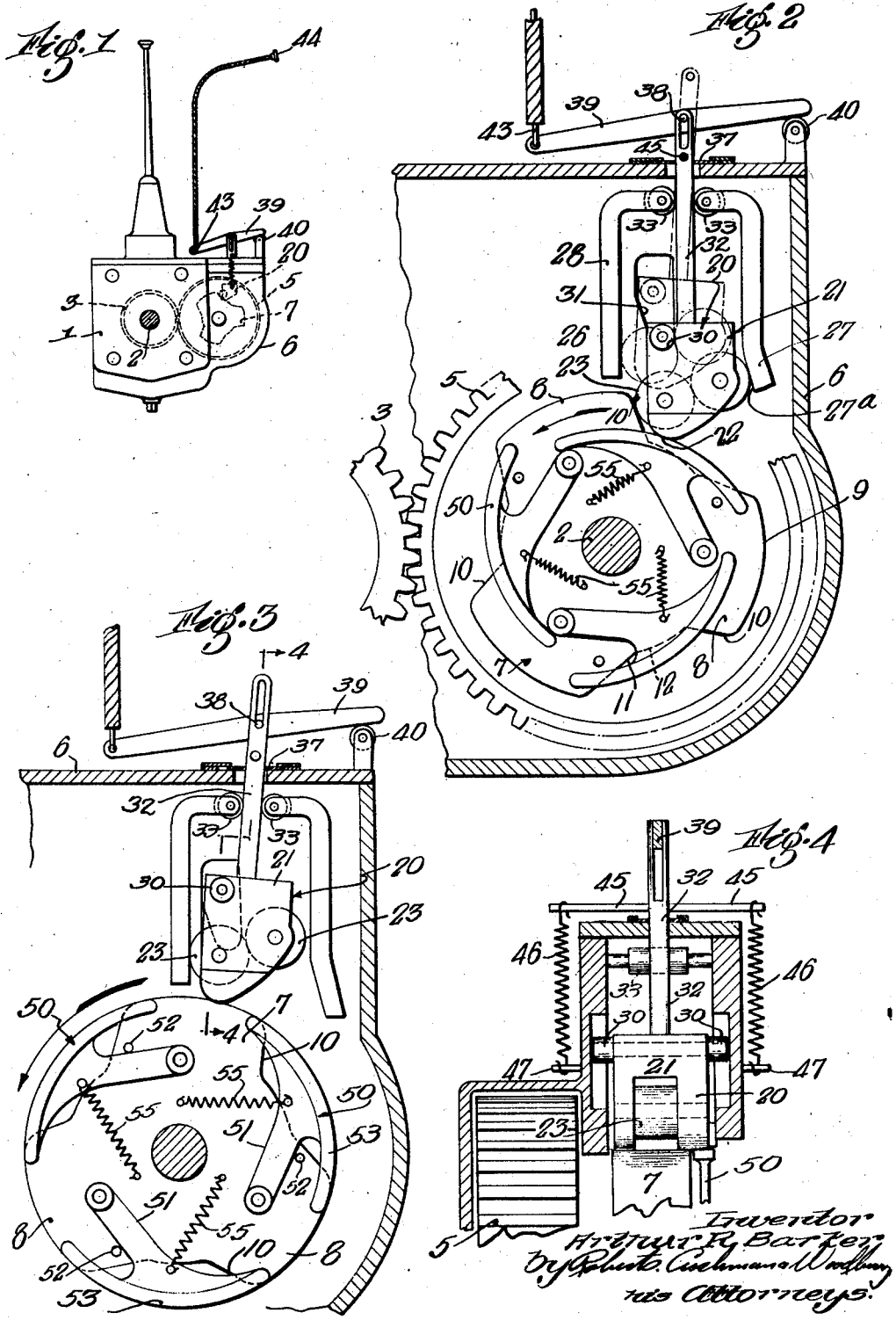

June 5, 1934.  A. R. BARKER  1,962,049
LOCKING MECHANISM
Filed April 19, 1932    2 Sheets-Sheet 2

INVENTOR
ARTHUR R. BARKER
ATT'YS

Patented June 5, 1934

1,962,049

UNITED STATES PATENT OFFICE 1,962,049

LOCKING MECHANISM

Arthur R. Barker, Littleton, Mass.

Application April 19, 1932, Serial No. 606,131

13 Claims. (Cl. 192—4)

This invention relates to locking mechanism arranged selectively or automatically to prevent the movement of a drive shaft in one direction and particularly to prevent the backward movement of a motor vehicle except when the reverse gear is engaged, such mechanism being associated with the drive shaft or an adjoining portion of the transmission gearing.

Under certain conditions it is highly desirable to have an arrangement either automatically or selectively operable to prevent the backward movement of a motor vehicle, as for example when the vehicle stops or is stopped upon a hill, which it has been ascending. It is difficult even for experienced operators properly to release the brakes and reengage the clutch under such conditions. Furthermore an arrangement of this character is effective positively to prevent backward movement when a car is parked on a hill or under similar circumstances. Locking devices of this character have heretofore been provided to permit these general results, but have generally had the disadvantage of holding the drive shaft and the portion of the transmission mechanism which directly revolves therewith, so that shifting of the gears sometimes becomes difficult or impossible, due to the thrust imparted through the locking device to the surfaces of the gears. Thus, if locking mechanism of this type happened to hold the gears in certain positions, starting of the car in a forward direction was prevented and it was sometimes necessary to resort to towing to get the car started.

This invention affords a locking device which may be selectively released, for example by a manually operable connection, so that the drive shaft and connected gearing may be released from the pressure imparted by the weight of the car to permit gears to be shifted and the car started in the usual manner. Furthermore, this arrangement permits the mechanism ordinarily to be held in its released position, but to be operated when desired, so that it is moved into its locking position when occasion requires.

A further aspect of this invention relates to the provision of means associated with a device of this character to assure the silent and automatic maintenance of the locking element in its inoperative position when the associated rotating abutment member is turning in a direction corresponding to the forward movement of the vehicle. Thus, for example, the rotating member may have a plurality of protuberances with abutment surfaces to engage the locking element, these surfaces being spaced to permit the locking element to move inwardly in the general direction of the axis of rotation to its locking position. Between the protuberances, I may provide a plurality of movably mounted parts which swing outwardly under the influence of centrifugal force to bridge the spaces between adjoining protuberances, and thus to afford a substantially continuous circular surface upon which the locking element may ride when the rotating member has attained a normal speed of rotation. When, however, the forward movement of the vehicle is interrupted and the movement of the rotary member stops, the centrifugally controlled members move inwardly under the action of springs to permit the rotary member to provide a plurality of spaced protuberances with recesses therebetween to receive the locking element rather than affording an effective cylindrical surface.

In the accompanying drawings:

Fig. 1 is a rear elevational view of a transmission mechanism showing my locking device associated therewith and illustrating somewhat diagrammatically the arrangement of a cooperating control element;

Fig. 2 is a vertical transverse section showing a portion of the mechanism in rear elevation and illustrating its connection with the transmission gearing;

Fig. 3 is a similar view showing the position of the parts when the centrifugally operable members are effective to hold the locking element out of engagement with the abutment faces;

Fig. 4 is a section indicated by line 4—4 of Fig. 3;

Figure 8:
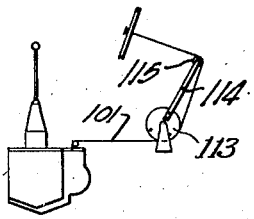
Fig. 8 is a diagrammatic view illustrating a control arrangement.

In the accompanying drawings, numeral 1 designates the transmission case of a motor vehicle, which may be of conventional design and which is provided with a main shaft 2 that may be directly connected with the drive shaft by means of a universal joint. A gear 3 may be slidably mounted upon a rear portion of the shaft 2, so that it also rotates with the drive shaft. This arrangement is customary in the art and is characterized by a gear such as the gear 3 which rotates whenever the rear wheels both rotate in the same direction.

The present invention more particularly relates to a locking device to prevent undesired backward movement of the vehicle and to this end comprises a spur gear 5 which meshes with the gear 3. The gear 3 may be arranged in the usual manner so that in one of its positions it engages a reverse gear. When moving to that position it slides out of engagement with the gear 5, thus automatically preventing operation of my locking means when the reverse gear is engaged and otherwise assuring the operative connection of the gear 5 of my locking means when, for example, the gear 3 is in low speed position; obviously the same general arrangement may be employed directly on the main drive shaft or an extension thereof in the gear box if desired. An extension 6 of the transmission casing 1 is provided to enclose the gear 5 and the associated locking mechanism.

Fixedly connected to the gear 5 is a rotary member 7, which is provided with a plurality of more or less cam-like protuberances 8 each having a substantially arcuate outer surface 9 and an abutment surface 10 lying substantially parallel to a radial line connecting the central portion of the corresponding arcuate surface 9 with the axis of rotation of member 7. The opposite end of each protuberance 8 may be provided with a gradually, outwardly inclined surface 11. Between the inclined surface 11 of one protuberance and the abutment surface 10 of the next protuberance, I may provide a substantially arcuate surface 12. The gradually inclined surfaces 11 are arranged upon the advance end of the corresponding protuberance 8 as the latter moves in a direction corresponding to the rotary movement of the gear 5 during the forward movement of the vehicle, such a direction of movement being indicated by the curved arrows of Figs. 2 and 3.

Cooperating with the rotary abutment member 7 is a locking element designated in general by numeral 20, which may have a movement into and out of engagement with the abutment surfaces 10. The member 20 may comprise a bifurcated block 21 having legs with cam-like lower surfaces 22 and a recess in which a pair of rollers 23 are mounted. These rollers preferably may be of similar size and in peripheral contact with each other, having axial extensions which project into suitable openings provided within the adjoining legs of the bifurcated block 21. One of the rollers 23 is positioned so that it has a peripheral portion contacting an abutment surface 10 of the member 7 when the device is in its locking position, as shown in full lines in Fig. 2, the plane of the axes of the rollers 23 being substantially perpendicular to the plane of the adjoining abutment surface 10. The roller 23 which is remote from the abutment surface preferably has a peripheral region in this plane which contacts an inclined wall 27 of an inner casing 28, the inclination of the inner surface 27ª of wall 27 being parallel to that of the abutment surface 10 which is engaging the lower roller 23. Thus, when the device is in its locked position the axes of rollers 23, their lines of contact with each other, with the abutment surface 10 and with the inner surface of wall 27, lie in a common plane which is perpendicular to the parallel surfaces 10 and 27ª.

At each side of the block 21 is a small guide roller 30, which is engageable with an inclined surface 31 parallel to the inclined surface 27ª.

The member 28 provides a bearing surface above the surface 27ª which lies at an angle to the latter being substantially vertically disposed as shown in Fig. 2, for example, and the opposite wall of member 28 provides a parallel vertical surface, thus affording a guideway which causes the locking element 20 to follow a path at an angle to its original path of movement as it leaves its locking position. This arrangement causes the rapid and positive ejection of the locking element from its locking position as the corner of a member 8 (between surfaces 9 and 10 of a protuberance) passes out of engagement with the corresponding roller 23 and into engagement with the cam-like surface 22.

The upper end of block 21 has a spindle 32 secured thereto which projects upwardly between rollers 33 that are mounted at opposite sides of a slot through which the spindle extends. Thus the spindle contacts the rollers, although the latter permit a slight tilting movement of the spindle as well as a vertical movement thereof. The spindle projects upwardly through a flexible washer 37 and has a slotted upper end receiving a pin 38 projecting from a rocking lever 39, one end of this lever rests on the fulcrum roller 40 and its opposite end is connected to a control element 43 of any suitable type, such as a Bowden wire. The opposite end of this wire may be connected to a control handle 44, Fig. 1, that is located at any convenient point, as for example, the instrument board of the vehicle.

A horizontal bar 45 has its intermediate portion secured to spindle 32 and has its end portions extending beyond the front and rear faces of the extension 6 of the transmission casing 1, tension springs 46 connecting these ends of the bar 45 with pins 47 that project from the front and rear faces of the casing portion 6, Fig. 4. Thus the springs 46 tend to urge the spindle 32 and the locking element 20 downwardly into locking position, while tension upon the control wire 43 is effective in swinging the rocking lever 49 about the fulcrum roller 40 to pull the spindle 32 upwardly against the action of the springs, thus to move the locking element 20 to its inoperative position. If desired, the Bowden wire may be arranged to operate with sufficient friction so that it will remain in this inoperative position as long as desired.

Pivotally mounted upon the abutment member 7 are a plurality of centrifugally controlled elements 50 corresponding in number to the number of protuberances 8. These members have inwardly extending arms 51 engageable with pins 52 projecting from the member 7 and integrally arcuate portions 53 which have outer surfaces with a curvature corresponding to that of the surfaces 9 of protuberances 8. Springs 55 have their opposite ends connected to the elements 50 and the member 7 and are arranged so that they tend to draw the members 50 inwardly to the position illustrated in Fig. 2, where the end of an arcuate portion 53 of one element may engage the pivoted end of the arm 51 of an adjoining element as a stop. Thus in this position of the members 50 the protuberances 8 project beyond the arcuate surfaces of these members to provide recesses in which the locking element 20 may be received. When the member 7 is rotating at any appreciable speed, centrifugal force moves the elements 53 outwardly until the arms 51 engage stop pins 52 and the outer surfaces of the arcuate portions 53 afford substantial continuations of the surfaces 9 of the protuberances 8, so that in effect a continuous cylindrical surface is afforded upon which the cam-like end portion 22 of member 21 may ride. Under these conditions the element 20 is automatically held out of its locking position and the spindle 32 slides upwardly in relation to the arm 39, as shown in Fig. 3.

A device of this character may be held by the manual control arrangement out of its locking position, as shown in dotted lines in Fig. 2, or may be pulled to this position whenever desired, even if the locking element is being engaged by a protuberance 7 and is subjected to the force imparted by the weight of the car, tending to move the same backwardly. Such a movement of the member 20 may occur despite the comparatively heavy thrust imposed thereon, since the surfaces 10 and 27ª are parallel to each other, and since the rollers 23 afford an anti-friction means permitting ready movement of the parts. On the other hand the position of the axes in these rollers and their lines of contact assures the effective locking of the member 7 against reverse movement when desired. As soon as the member 20 is thus lifted by the Bowden wire it will rise to a point where the roller 23 no longer engages the abutment surface 7 but will move into engagement with the inner wall 26 of the housing 28, the rollers 30 being effective to guide the member 20 as it passes from the full-line position shown in Fig. 2 to the dotted line position shown in that figure. When tension upon the Bowden wire 43 is released the springs 46 are effective in urging the member 20 downwardly so that the latter may lie between the protuberances 8 and engage one of the abutment surfaces 10. However, if the member 20 occupies this position and the gear 5 is moved in a direction corresponding to the forward movement of the car the cam surface 22 of member 20 will ride upwardly upon the gradually inclined surfaces 11 of protuberances 8 with a cam-like action permitting the rotation of the parts in this direction. As the member 7 attains speed, the elements 50 move outward due to centrifugal force so that the member 20 rides upon the arcuate surfaces of these members and upon the aligned arcuate surfaces 9 so that the member 20 is in effect engaging a substantially cylindrical unit. Thus noise and vibration is avoided as soon as the member 7 gains speed in a forward direction. If the control arm 39 and element 43 remain in the position shown in full lines in Fig. 2, the member 20 moves downwardly under the action of springs 46 as soon as the forward speed of the member 7 is substantially interrupted, so that the member 20 may move into its locking position automatically to prevent reverse movement of the drive shaft and the vehicle, thus preventing undesired backward movement of the car. If the Bowden wire has been frictionally held under tension so that the member 20 remains in its dotted line position, of Fig. 2, the latter may be released to permit the springs 46 to move the element 22 to its locking position, thus preventing backward movement of the car.

Figure 5:
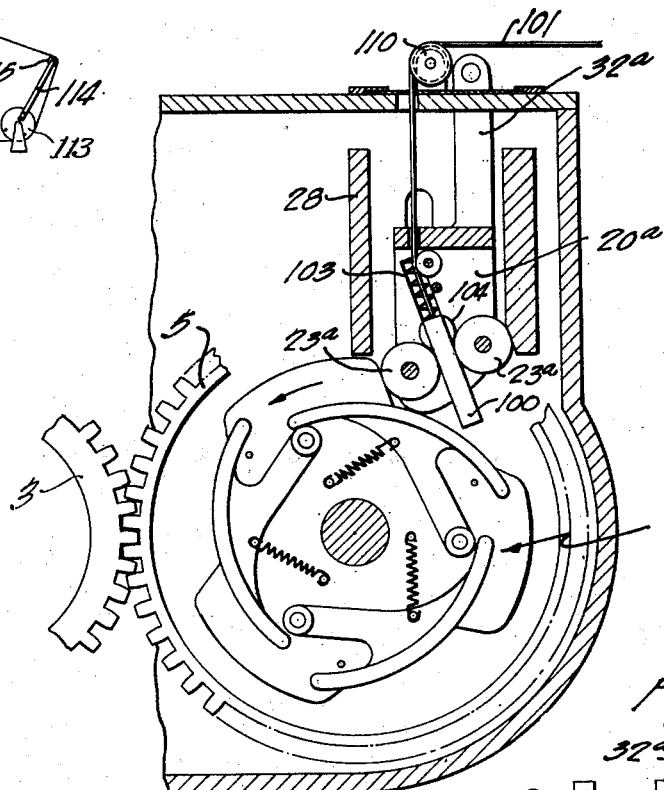
Fig. 5 is a sectional view corresponding to Fig. 2, but showing an optional embodiment of the invention.
Figure 6:
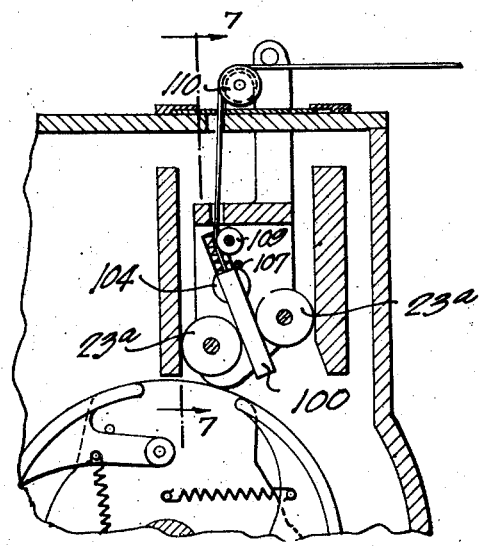
Fig. 6 is a similar view of the portion of the mechanism in its released position.
Figure 7:
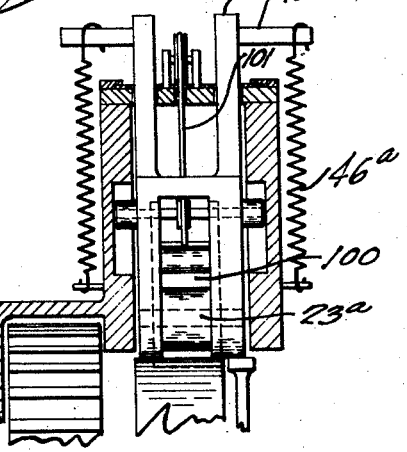
Fig. 7 is a section on line 7—7 of Fig. 6.

Figs. 5, 6 and 7 illustrate an optional development of my invention wherein the gear 5 and the abutment member 7 may be of the same type as previously described and illustrated in Figs. 1 to 4, inclusive. The general arrangement of the casing with the internal guide member 28 may be also of the type described above. The locking device 20ª may be generally similar to the device 20 but the rollers 23ª are spaced in this embodiment of the invention and receive a metal bar 100 in frictional engagement with their peripheries. The upper end of this bar is connected to an actuating wire 101 and a coiled compression spring 103 tends to push the bar 100 downwardly between rollers 23ª until an enlarged end portion 104 of the bar engages the rollers as a stop; this position of the parts being illustrated in Fig. 5. A pin 107, Fig. 6, engages the enlargement 104 to act as a stop limiting the upward movement of bar 100 in relation to locking element 20ª. The pull wire 101 passes over a guide roller 109 upon the locking device 20ª and over an exterior roller 110 to a swinging pulley element 113 upon the outside of the casing which carries an outstanding lever 114 having a roller 115 at its outer end about which the wire 101 extends. The upper end of element 20ª is provided with projections 32ª having outstanding bars 45ª (Fig. 7) at its upper end engageable with springs 46ª which normally tend to impel the locking device 20 downwardly into the path of the protuberances upon the abutment member 7.

In its locking position the element 20ª will have its parts normally disposed as shown in Fig. 5. When the wire 101 is then pulled, the bar 100 frictionally engages the rollers 23ª and causes their rotation, the spring 103 also imparting an upward thrust to the body portion of the member 20ª thus a singularly effective arrangement is afforded for assuring the movement of the roller 23ª out of engagement with the abutment face of member 7. The spring 103 may be compressed as shown in Fig. 6 as the locking element leaves its locking position, whereupon the spring may partially expand and may then remain somewhat under compression since it supports the weight of the element 20 and is counteracting the effect of springs 46ª. When the pull upon the wire 101 is released, the springs 46ª are effective in returning the locking device to its locking position, the spring 103 being effective in pushing the bar 100 downwardly between rollers 23ª.

It is evident that an arrangement of the type disclosed and described herein may also be employed for preventing forward movement of a vehicle, if desired.

I claim:

1. Mechanism of the class described comprising a shaft, an abutment member rotatable in response to rotation of the shaft and provided with a plurality of protuberances having abutment surfaces, a movable locking element, supporting means for said element permitting its movement outwardly in a direction away from the axis of rotation of the abutment member, and manually operable means to effect such a movement of the locking element, said locking element including rollers, one of said rollers contacting an abutment face of the abutment member and the other roller contacting a surface provided by the supporting means when the element is in its locking position.

2. Mechanism of the class described comprising a shaft, an abutment member rotatable in response to rotation of the shaft and provided with a plurality of protuberances having abutment surfaces, a movable locking element, supporting means for said element permitting its movement outwardly in a direction away from the axis of rotation of the abutment member, and manually operable means to effect such a movement of the locking element, said locking element including rollers, one of said rollers contacting an abutment face of the abutment member and the other roller contacting a surface provided by the supporting means when the element is in its locking position, said last-named surface being in substantial parallelism to the abutment surface engaged by the roller, the rollers having axes of rotation in a plane which intersects said surface upon the supporting means and the abutment surface substantially at right angles thereto, and substantially at the lines of contact of the rollers with these respective surfaces.

3. Mechanism of the class described comprising a shaft, an abutment member rotatable in response to rotation of the shaft and provided with a plurality of protuberances having abutment surfaces, a movable locking element, supporting means for said element permitting its movement outwardly in a direction away from the axis of rotation of the abutment member, and manually operable means to effect such a movement of the locking element, said locking element including rollers, one of said rollers contacting an abutment face of the abutment member and the other roller contacting a surface provided by the supporting means when the element is in its locking position, said last-named surface being in substantial parallelism to the abutment surface engaged by the roller, the rollers having axes of rotation in a plane which intersects said surface upon the supporting means and the abutment surface substantially at right angles thereto, and substantially at the lines of contact of the rollers with these respective surfaces, said rollers contacting each other along a line which is substantially in said plane.

4. Mechanism of the class described comprising a shaft, an abutment member rotatable in response to rotation of the shaft and provided with a plurality of protuberances having abutment surfaces, a movable locking element, supporting means for said element permitting its movement outwardly in a direction away from the axis of rotation of the abutment member, and manually operable means to effect such a movement of the locking element, said element cooperating with its supporting means to lock the abutment member against rotation in one direction when it is in locking engagement with one of the protuberances, said locking element including rollers, one of said rollers contacting an abutment face of the abutment member and the other roller contacting a surface provided by the supporting means when the element is in its locking position, the locking element having guide rollers and the supporting means providing surfaces to engage these rollers to facilitate movement of the element into and out of locking position.

5. Mechanism of the class described comprising a transmission including a spur gear, a gear in mesh therewith, a rotary abutment member connected to said last-named gear, said abutment member providing a plurality of protuberances with abutment surfaces, a locking element movable in a path substantially parallel to one of said abutment surfaces, resilient means normally tending to move the locking element inwardly toward the center of rotation of the abutment member and thus tending to move said element to its locking position, and controllable parts movably mounted upon the abutment member so that they move under the influence of centrifugal force when the abutment member rotates at substantial speed, said last-named elements having arcuate surfaces and the protuberances having cooperating arcuate surfaces which cooperate in providing a substantially continuous cylindrical surface to prevent the locking element from moving inwardly between the protuberances when the abutment member is rotating at substantial speed.

6. Mechanism of the class described comprising a rotary abutment element provided with a plurality of protuberances, a movable locking element, supporting means for said locking element permitting its movement outwardly in a general direction away from the axis of rotation of the abutment member, and manually operable means to effect such a movement of the locking element, said elements providing anti-friction means at their points of contact to facilitate such a movement, said locking element cooperating with its supporting means to lock the abutment member against rotation in one direction when it is in locking engagement with one of the protuberances.

7. Mechanism of the class described comprising a rotary abutment element provided with a plurality of protuberances, said protuberances providing a plurality of abutment surfaces, a movable locking element, supporting means for said locking element providing a surface substantially to parallel an abutment surface when the locking element is in locking position and providing a surface inclined to said first-named surface to guide the locking element as it passes out of its locking position, said supporting means being arranged to permit the locking element to move outwardly in a general direction away from the axis of rotation of the abutment element and means operable to effect such a movement of the locking element, said elements providing anti-friction means at their points of contact to facilitate such a movement, said locking element cooperating with the first-named surface of its supporting means to lock the abutment element against rotation in one direction when it is in locking engagement with one of the protuberances.

8. Mechanism of the class described comprising a transmission including a shaft, an abutment member rotatable in response to rotation of the shaft and provided with a plurality of protuberances having abutment surfaces, a movable locking element, supporting means for said element permitting its movement outwardly in a direction away from the axis of rotation away from the abutment member, said supporting means providing a surface substantially parallel to an abutment surface when the latter is being engaged by the locking means and affording an adjoining guide surface at an angle to said first-named surface, manually operable means to effect movement of the locking element out of its locking position, said locking element including rollers, one of said rollers contacting an abutment face of the abutment member and the other roller contacting the parallel surface provided by the supporting means when the element is in its locking position, the rollers having axes of rotation in a plane which intersects the first-named surface upon the supporting means of the abutment surface substantially at right angles thereto, the locking element being movable first along a path parallel to the abutment surface and the first-named surface of the supporting means and thereafter following the second-named surface of the supporting means whereby it moves at an angle to its path of original movement as it moves out of contact with the abutment member to release the same.

9. Mechanism of the class described comprising a rotary abutment element provided with a plurality of protuberances, said protuberances providing respective abutment surfaces, a movable locking element, supporting and guiding means for said element providing a surface substantially parallel to an abutment surface when the locking element is in locking position, said supporting and guiding means being arranged to direct the locking element along a path in a general direction away from the axis of rotation of the abutment member, said locking element having a pair of rollers, a bar disposed between the rollers and in frictional engagement therewith, a spring tending to impart a movement to the bar along a path substantially perpendicular to the plane of the axes of the rollers, operating means arranged to pull the bar along this path against the action of the spring, thereby to cause rotary movement of the rollers about their respective axes, not only due to the frictional engagement of the bar with the rollers but also due to the tendency of the spring to move the entire locking element.

10. Mechanism of the class described comprising a rotary abutment element provided with a plurality of protuberances, said protuberances providing respective abutment surfaces, a movable locking element, supporting and guiding means for said element providing a surface substantially parallel an abutment surface when the locking element is in locking position, said supporting and guiding means being arranged to direct the locking element along a path in a general direction away from the axis of rotation of the abutment member, said locking element having a pair of rollers, a bar disposed between the rollers and in frictional engagement therewith, a spring tending to impart a movement to the bar along a path substantially perpendicular to the plane of the axes of the rollers, operating means arranged to pull the bar along this path against the action of the spring, thereby to cause rotary movement of the rollers about their respective axes, not only due to the frictional engagement of the bar with the rollers but also due to the tendency of the spring to move the entire locking device, said bar having a part to limit its movement in one direction between the rollers under the action of the spring, and a stop to limit the movement of the bar in the opposite direction.

11. Mechanism of the class described comprising a shaft, a rotary abutment member on the shaft, said abutment member providing a protuberance with an abutment surface, a locking element movable in a path substantially parallel to said surface in one of its positions, means yieldable to move the locking element inwardly toward the center of rotation of the abutment member and thus tend to move said element to its locking position, and a part movably mounted upon the abutment member and rotatable therewith arranged to move outwardly when said member rotates at substantial speed due to the effect of centrifugal force, said element having a substantially arcuate outer surface adapted to extend from the region of the protuberance to provide a surface cooperating with and affording a substantial continuation of the outer surface of said protuberance, thus being adapted automatically to prevent the locking element from moving inwardly between the protuberances when the abutment member is rotating at substantial speed.

12. Mechanism of the class described comprising a shaft, a rotary abutment member mounted on said shaft and rotatable therewith, said abutment member providing a plurality of protuberances with abutment surfaces, a locking element movable in a path substantially parallel to one of the positions of said abutment surfaces, means yieldably to move the locking element inwardly toward the center of rotation of the abutment member and thus to move said element toward its locking position, supporting means for said locking element affording a fixed surface substantially parallel to said path of movement of the locking element, a pair of rollers included in said locking element, one of said rollers being arranged to engage said last-named surface and the other roller being arranged to engage the abutment surface, the element providing a cam-like portion projecting inwardly in the general direction of the shaft beyond said last-named roller, said portion being effective in engaging a surface of the abutment member spaced radially inward from its outer surface when the roller engages the abutment surface, said cam-like portion engaging the corner of the protuberance in advance of the roller, thus to prevent locking engagement of the locking element with the abutment member before the former is advanced into a position wherein the roller can engage the abutment surface.

13. Mechanism of the class described comprising a shaft, a rotary abutment member carried on the shaft provided with a plurality of protuberances, said protuberances providing abutment surfaces, a movable locking element, supporting means for said element, providing a guiding surface substantially parallel to one of the positions of the abutment surfaces, actuating means to permit movement of the locking element inwardly toward the center of the abutment member and away therefrom, said means including a spindle fixed to the locking element and roller elements disposed at either side of the spindle and permitting a pivotal movement of the same as well as a sliding movement thereof.

ARTHUR R. BARKER.